Feb. 24, 1931.                R. GROVES                1,793,692
                            CORN HARVESTER
                    Filed Aug. 17, 1928          4 Sheets-Sheet 4
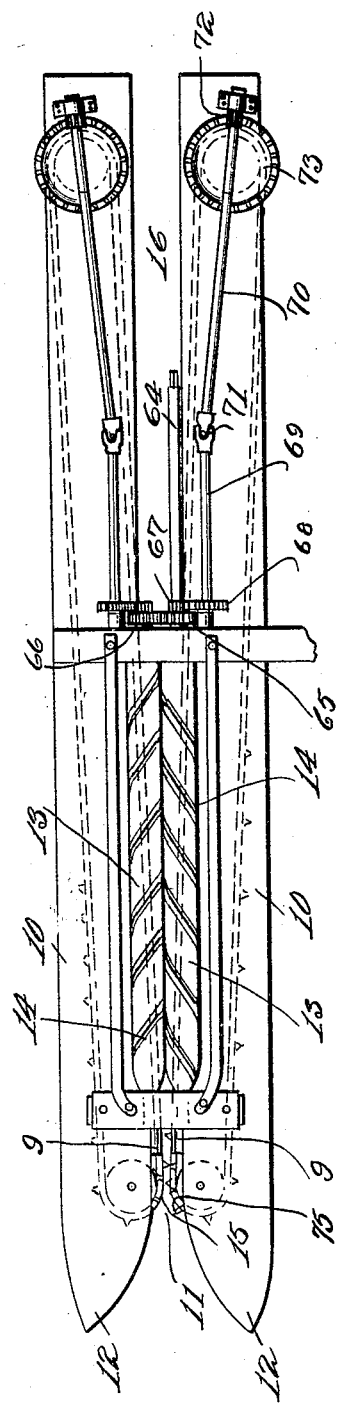
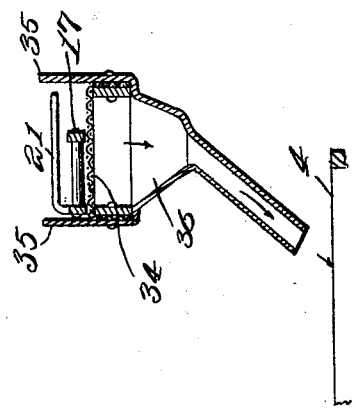
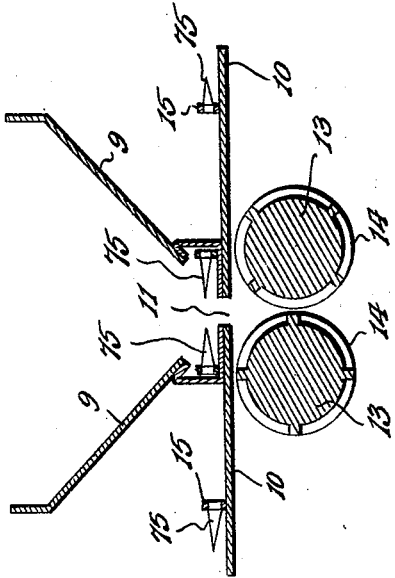
Inventor
Roy Groves.
By Lacey & Lacey, Attorneys Patented Feb. 24, 1931

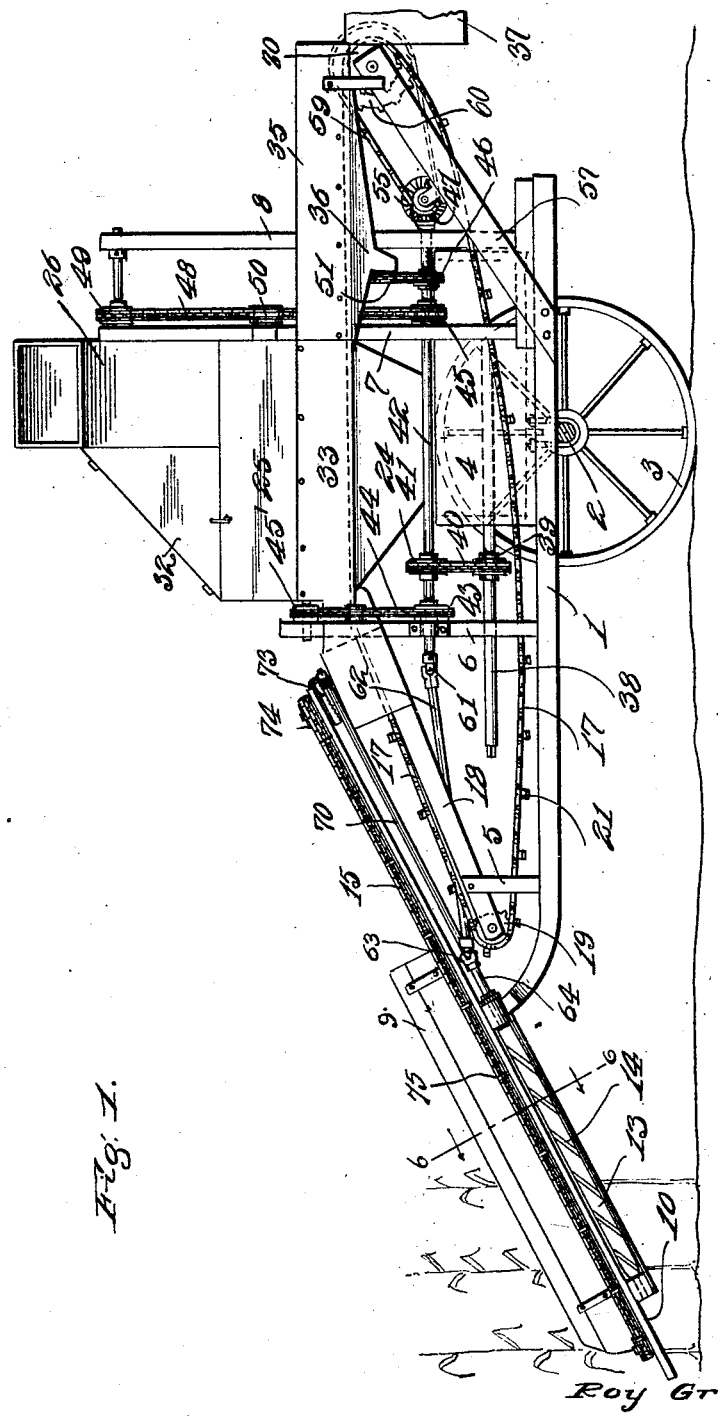

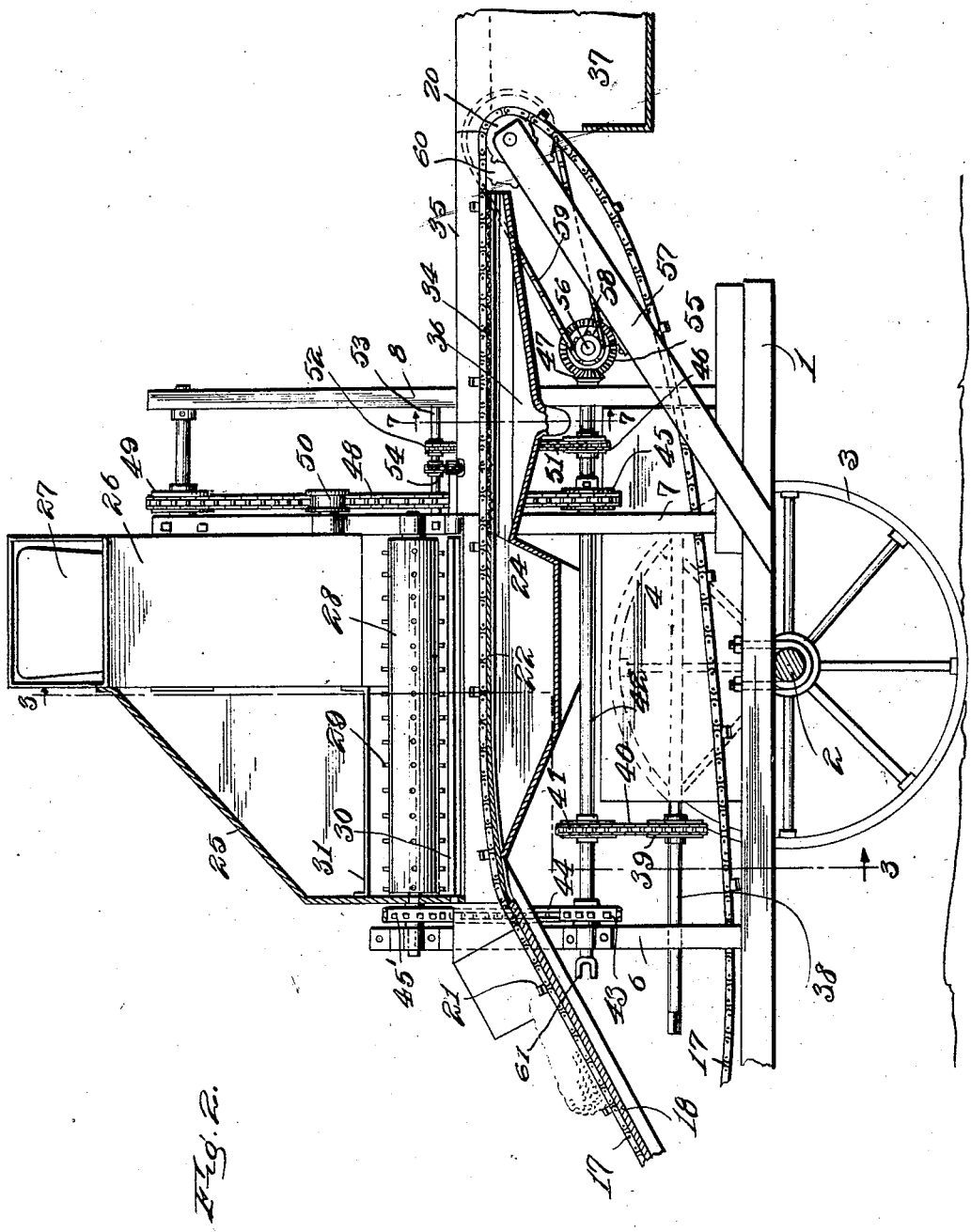

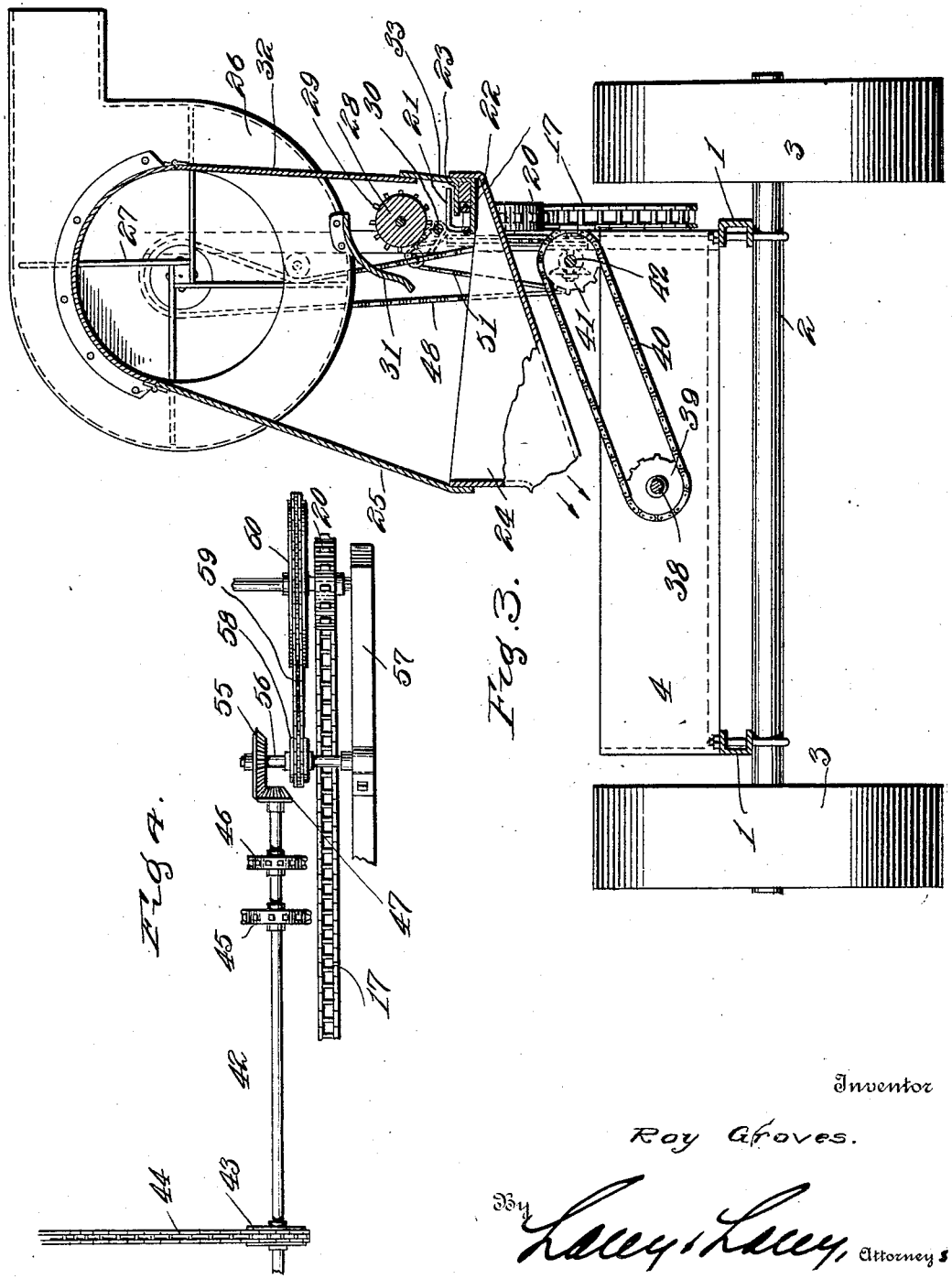

1,793,692

UNITED STATES PATENT OFFICE

ROY GROVES, OF SYLVIA, KANSAS

CORN HARVESTER

Application filed August 17, 1928. Serial No. 300,295.

This invention relates to corn harvesters and has for its object the provision of an apparatus which may be coupled to and driven by a tractor and which will operate as it is drawn over the field to strip the ears of corn from the stalks and then remove the husks and shell the corn, the husks and dirt being withdrawn and the cobs and shelled corn being delivered into separate receptacles. The invention provides a compact machine in which the elements for performing the stated operations will be simple in construction and efficient in action. The invention is illustrated in the accompanying drawings and will be hereinafter first fully described and then more particularly defined in the appended claims.

In the drawings:

Figure 1 is a side elevation of an apparatus embodying the invention;

Fig. 2 is an enlarged longitudinal section of the corn-husking and shelling mechanism;

Fig. 3 is a transverse section on the line 3—3 of Fig. 2;
Fig. 4 is a detail plan view of a portion of the driving gearing;

Fig. 5 is a bottom plan view of the gathering mechanism;

Fig. 6 is an enlarged transverse section on the line 6—6 of Fig. 1, and

Fig. 7 is an enlarged detail transverse section on the line 7—7 of Fig. 2.

In carrying out the present invention, there is provided a frame consisting of sills or side bars 1 carrying an axle 2 upon which ground wheels 3 are mounted. The sills 1 are preferably of channel bars, as shown most clearly in Fig. 3, and they may be connected at their front ends in any convenient manner so as to furnish a rigid support for the corn-gathering mechanism and be coupled to a tractor so that the machine may be drawn over the field. A platform of any approved form may be secured upon the sills 1 and, preferably at a point over the axle 2, a box 4 is provided to receive the shelled corn. Suitable uprights, indicated at 5, 6, 7 and 8, are also mounted upon the sills to provide supports for the working mechanism which will be hereinafter fully set forth.

Supported by the front ends of the sills is a gathering mechanism consisting of upwardly diverging rails 9 and bottom plates 10 which are disposed longitudinally of the machine and have their inner edges spaced apart to provide a slot or guideway 11 into which the standing stalks may enter. The lower front ends of these plates are tapered, as shown at 12 in Fig. 5, whereby they may readily enter below leaning stalks and guide them into an upright position within the slot or passageway 11. Mounted in suitable bearings on the under sides of these plates 10 are stripping or snapping rolls 13 having spirally disposed ribs 14 formed thereon and so operated that the sides thereof presented to each other will move downwardly whereby the stalks will tend to be bent rearwardly and the ears thereon will be brought forcibly against the upper sides of the plates at the inner edges thereof to be snapped from the stalks. Mounted on the upper sides of the plates 10 are endless chains 15 having their inner runs disposed under the lower edges of the rails 9 in position to engage the ears stripped from the stalks and carry them upwardly and rearwardly, and it will be noted upon reference to Fig. 5 that the rear portion of the slot 11 is widened, as indicated at 16, so that as the ears successively reach the upper end portion of the slot they will fall through the same onto the conveyer chain 17.

The conveyer chain 17 extends longitudinally of the machine and its lower run is disposed below the driving mechanism and in its forward portion extends close to the sills, as shown in Figs. 1 and 3. The forward portion of the upper run of the conveyer chain 17 travels over an inclined chute 18 rigidly supported by the uprights 5 and 6 and imperforate so that it will prevent the ears of corn dropping to the ground, the chain passing around an idler sprocket 19 at the lower front end of said chute and over a driving sprocket 20 near the rear end of the machine and driven by power derived from the tractor, as will hereinafter more fully appear. At intervals along the chain 17, carrier lugs or fingers 21 are secured thereto to engage the ears of corn and positively cause them to travel with the chain, as will be understood upon reference to Fig. 2. Immediately adjacent the upper rear end of the chute 18 and alined therewith is a deck 22 over which the conveyer runs and upon said deck along the outer edge portion thereof is a guide flange 23 which overhangs the inner edge of the conveyer chain, as shown most clearly in Fig. 3, and thereby holds it to a true rectilinear path to properly present the ears of corn to the husking and shelling roller. Below the deck 22, an open bottom hopper or chute 24 is provided to receive the shelled corn and direct the same into the box 4, as will be understood upon reference to Figs. 2 and 3, and a housing 25 is provided over said hopper or chute and over the conveyer chain to enclose all the parts and prevent loss of the shelled corn. This housing includes a fan or blower casing 26 in which is mounted a suction fan 27 which in operation draws the corn husks and the dust and dirt which may be brought up with the ears into the fan casing and discharges the same at the side thereof to fall upon the ground at the side of the line of travel of the machine.

The husking and shelling roller comprises a cylindrical roll 28 disposed longitudinally of the machine directly over the deck 22 and the conveyer chain traveling thereover and provided with radial pins 29 throughout its circumference adapted to engage in the corn husks and strip the same from the ears. Disposed between the roll 28 and the conveyer chain is a tumbler shaft 30 which is angular in cross section and adapted to rotate against the side of the ears so that they will be rolled about their longitudinal axes as they travel past the roll 28 to facilitate the stripping of the husks and the shelling of the kernels. The direction of rotation of the roll and the tumbler shaft is such that the ear of corn will be rotated in opposition to the husking and shelling roll and it will be consequently prevented from slipping toward the outer side of the casing or trough through which it travels. As has been stated, the husks and loose dirt will be drawn upward by the action of the fan 27 but the kernels of corn will be projected into the chute or hopper 24 and thence pass into the box 4 in an obvious manner. Above the husking roller is a shield or deflector 31 consisting of an arcuate plate extending longitudinally of the machine and secured to the front wall of the housing 25 and the side of the fan casing, said plate extending downwardly and inwardly substantially concentric with the roll 28, as shown in Fig. 3. A door 32 is provided in the outer side of the housing 25 to permit access to the husking roll and the parts cooperating therewith when necessary and below said door is an outer rail or side wall 33 which with the deck 22 forms a trough or guideway through which the ears of corn are caused to travel to be acted upon by the husking roll.

At the rear of the deck 22 and, in effect, forming a continuation thereof is a screen 34 supported between side rails 35 and disposed over a supplemental hopper or chute 36 which is adapted to catch any kernels which may be brought beyond the deck 22 by the conveyer chain and direct the same into the box 4, it being understood that the conveyer chain passes over the upper surface of the screen 34 which extends close to the driving sprocket 20, as shown clearly in Fig. 2. The shelled cobs will be carried rearwardly by the conveyer chain and may be discharged onto the ground or deposited in a box 37 carried by the rear end of the frame. It may sometimes be found desirable to mount an elevating conveyer in the box 37 so that as the cobs are deposited therein they may be immediately transferred to a wagon driven alongside the corn harvester and husker.

The power for operating the several described working elements is derived from the tractor and is received by a main driving shaft 38 mounted longitudinally upon the frame and coupled in any convenient manner to the power take-off shaft of the tractor. The particular location of this main driving shaft is immaterial but I have found it convenient to pass the same through the front and rear sides of the box 4 and have so shown it. At any convenient point of the main driving shaft 38, a sprocket 39 is secured thereto and a chain 40 is trained around said sprocket and a sprocket 41 secured upon a longitudinal transmission shaft 42 which is mounted upon the uprights 6, 7 and 8 of the machine. Near the front end of this transmission shaft 42, a sprocket 43 is secured thereon and a chain 44 is trained around said sprocket and a sprocket 45' on the front end of the shaft of the husking roll 28. Near the rear end of the shaft 42, sprockets 45 and 46 are secured thereon and at the rear extremity of the shaft is secured a beveled pinion 47. A chain 48 is trained around the sprocket 45 and a similar sprocket 49 secured upon the fan shaft so that power will be transmitted to the latter, and an idler 50 is shown in Fig. 2 to maintain the tension upon said chain 48. It may be noted at this point that similar idlers may be provided wherever necessary to maintain the tension of the several driving chains, and also that the chain 44 and the sprockets cooperating therewith may be located at the fan-driving chain 48 if preferred. A chain 51 is trained about the sprocket 46 and about a sprocket 52 secured upon a counter-shaft 53 and said counter-shaft is connected by chain and sprocket gearing, indicated at 54, with the tumbler shaft 30 to actuate the latter. The beveled pinion 47 meshes with a beveled gear 55 upon a shaft 56 which is supported in any convenient manner upon frame elements 57, and a sprocket 58 is secured upon said shaft 56, a chain 59 being trained about said sprocket and about a sprocket 60 secured upon the shaft of the driving sprocket 20, as will be understood upon reference to Fig. 4. It will thus be seen that the conveyer chain 17 and the fan and husking roll and the tumbler shaft are all driven simultaneously and in proper synchronism to attain the desired operations. To drive the gathering mechanism, a universal coupling, indicated at 61, is fitted to the front end of the transmission shaft 42 and connects the same with an intermediate shaft 62 which is connected by a second universal joint 63 with the rear end of a shaft 64 suitably supported upon the inner guide or base plate 10. This shaft 64 is secured directly in the rear end of the inner roller 13 and has secured thereon a gear 65, meshing with a similar gear 66 rigidly connected to the rear end of the outer roller 13, and also a pinion 67 which meshes with a gear 68 upon a shaft 69 which is mounted upon the under side of the adjacent plate 10. To the rear end of the shaft 69, a shaft 70 is connected by a universal joint 71 and the rear end of said shaft 70 is equipped with a pinion 72 meshing with a crown gear 73 at the rear end of the plate 10 and fixed to a shaft rising through said plate. On the upper end of said shaft is a sprocket 74 about which one gathering chain 15 is trained, and this mechanism is duplicated at the other side of the gathering mechanism, as shown in Fig. 5. The arrangement of these parts causes the inner opposed runs of the chains 15 to travel rearwardly so that the spaced fingers 75 thereon will engage the ears of corn and feed them in the proper direction, and the universal joints permit proper coupling of the main transmission parts and permit them to be disposed out of the way of the ears of corn droping to the conveyer chain 17.

From the foregoing description, taken in connection with the accompanying drawings, it will be seen that I have provided a very simple, compact and efficient mechanism whereby ears of corn may be stripped from standing stalks and by a continuous operation will be relieved of the husks and shelled, the husks being thrown to one side upon the ground while the kernels of corn and the cobs will be delivered into separate receptacles for subsequent storage and use.

Having thus described the invention, I claim:

1. In a corn harvester and husker, gathering mechanism, a conveyer for receiving ears of corn from the gathering mechanism and carrying them therefrom, a husking and shelling roll arranged adjacent and parallel with said conveyer to engage the ears of corn thereon, and a tumbler shaft disposed between the conveyer and said roll to engage the ears of corn on the conveyer and impart rotary motion thereto.

2. In a corn harvester and husker, a gathering mechanism, a conveyer extending from said mechanism and receiving ears of corn therefrom, a trough through which the conveyer passes, a husking roll arranged over the trough and parallel therewith to engage the ears of corn on the conveyer, a screen at the rear of the trough over which the conveyer passes, and a chute below said screen.

3. In a corn harvester and husker, gathering mechanism, a conveyer receiving ears of corn from the gathering mechanism and carrying them therefrom, a husking roll arranged adjacent and parallel with the conveyer to engage the ears of corn thereon, and a suction fan arranged adjacent said husking roller to carry off husks stripped from the ears by said roller.

4. In a corn harvester and husker, a gathering mechanism, a conveyer receiving ears of corn from said mechanism and carrying them therefrom, a trough through which the conveyer travels, said trough having an element overlying the conveyer to guide the same, a husking roll arranged above the trough to engage ears of corn on the conveyer, and a hopper below the trough.

5. In a corn harvester and husker, gathering mechanism, a conveyer receiving ears of corn from the gathering mechanism and carrying them therefrom, said conveyer comprising an endless chain and spaced fingers secured thereon, a trough through which the conveyer travels, and a husking roll arranged within the trough over the conveyer to engage ears of corn thereon.

6. In a corn harvester and husker, gathering mechanism comprising inclined supporting plates having their inner side edges spaced apart, gathering chains mounted upon the said plates to engage ears of corn above the plates and convey them toward the upper ends of the plates, and stripping rollers mounted on the under sides of the plates and engaging stalks between the plates to bend the same rearwardly and downwardly.

7. In a corn harvester and husker, gathering mechanism comprising inclined supporting plates having their inner side edges spaced apart, gathering chains mounted upon the said plates to engage ears of corn above the plates and convey them toward the upper ends of the plates, stripping rollers mounted on the under sides of the plates and engaging stalks between the plates to bend the same rearwardly and downwardly, and mechanism below the plates for synchronously operating the rollers and said gathering chains.

In testimony whereof I affix my signature.

ROY GROVES. [L. S.]